United States Patent
Pan

(10) Patent No.: US 8,064,486 B2
(45) Date of Patent: Nov. 22, 2011

(54) DETERMINATION OF CHANNEL LATENCY WITHIN A ROUND-TRIP PATH

(75) Inventor: Zhong Pan, Davis, CA (US)

(73) Assignee: Infinera Corporation, Sunnyvale, CA (US)

( * ) Notice: Subject to any disclaimer, the term of this patent is extended or adjusted under 35 U.S.C. 154(b) by 325 days.

(21) Appl. No.: 11/852,186

(22) Filed: Sep. 7, 2007

(65) Prior Publication Data

US 2009/0067338 A1 Mar. 12, 2009

(51) Int. Cl.
*H04J 3/06* (2006.01)
*H04B 17/00* (2006.01)
*H04B 10/08* (2006.01)
*H04B 10/00* (2006.01)

(52) U.S. Cl. .................. 370/516; 398/25; 398/156

(58) Field of Classification Search ............ 370/249, 370/503–509, 516, 517, 519; 398/25, 33, 398/156, 161
See application file for complete search history.

(56) References Cited

U.S. PATENT DOCUMENTS

| 7,187,860 | B2 * | 3/2007 | Bergano et al. ............ 398/9 |
| 7,212,551 | B1 * | 5/2007 | Beshai et al. ............. 370/509 |
| 7,333,729 | B2 * | 2/2008 | Minato et al. ............. 398/82 |
| 2003/0072328 | A1 * | 4/2003 | Echartea et al. .......... 370/470 |
| 2003/0120780 | A1 * | 6/2003 | Zhu et al. ................ 709/226 |
| 2004/0184487 | A1 * | 9/2004 | Kim ...................... 370/516 |
| 2004/0264434 | A1 * | 12/2004 | Weissberger et al. ...... 370/350 |
| 2007/0086332 | A1 * | 4/2007 | Way et al. ................ 370/223 |

* cited by examiner

*Primary Examiner* — Xavier Szewai Wong
(74) *Attorney, Agent, or Firm* — Ross M. Carothers; North Weber & Baugh LLP; David L. Soltz

(57) ABSTRACT

The present invention provides a system, apparatus, and method for determining latency differences in channels within a link at a single test site. In particular, the method allows for a single transmitting device to determine distinct latency differences on both transmitter and receiver-side paths without requiring a terminating node on the other side of the connection. In other words, a switch is used, in lieu of such a terminating node, at the other side of the paths that switches at least one channel's content onto another channel and sends it back for a round trip on various transmitter-and-receiver-side-paths combinations. The present invention is based on round trip measurements and switching capability of the receiving node.

19 Claims, 5 Drawing Sheets

DETERMINATION OF CHANNEL LATENCY WITHIN A ROUND-TRIP PATH

CROSS REFERENCE TO RELATED PATENT APPLICATIONS

This application is related to U.S. application Ser. No. 11/781,912, entitled "Communication Network with Skew Path Monitoring and Adjustment," filed Jul. 23, 2007, which application is incorporated herein by reference.

BACKGROUND

A. Technical Field

This invention relates generally to optical transport networks, and more particularly to the determination of link latency within a round-trip path.

B. Background of the Invention

Optical networks are able to communicate information at high data rates. Maintaining the relative timing and sequence of this information being communicated is important for proper operation of such networks. In a multi-channel communication link, certain applications require measuring the latency difference between channels. Latency, a synonym for delay, is an expression of how much time it takes for data to get from one designated point to another. Different sources contribute to latency in different networks. As an example, in a point-to-point optical link, latency mainly includes the propagation delay, which is the time it takes for data to travel through the fiber at the group velocity of light, and the delays at intermediate nodes, which are mainly induced by the various optical components used. If the link contains optical-to-electrical-to-optical (hereinafter, "O/E/O") sites, the latency may further include electrical processing and switching delays.

FIG. 1 illustrates a general method to measure latency difference in a multi-channel communication link. A pattern generator 110, integrated within a transmitter 100, generates a single pattern stream that is split into two pattern streams or channels at the transmitter 100 and transmits the two pattern streams down a transmission link 120 on the two channels, $A_1$ and $A_2$ in this example, that are being tested.

A receiving node 130, coupled to the transmission link, generates a trigger signal 140 based upon a common feature, such as an adjustment bit sequence, in each of the two pattern streams being transmitted down channels $A_1$ and $A_2$ respectively. An oscilloscope 150 comprising two input channels sharing the exact same time base, coupled to the receiver node 130, receives the two trigger generated signals 140 and thus measures the time delay ($A_1$-$A_2$) between the two pattern streams. Assuming the measurement induced additional latency difference is negligible, this measured time delay is equal to the latency difference. This measurement is meaningful when the latency difference is stable; it is feasible when the latency difference is in the delay measurement range of the oscilloscope and the fluctuation of both latency values is slow enough so that it can be followed by the oscilloscope.

Pattern streams may contain periodic features to generate periodic triggers in order to sustain the oscilloscope scans. To avoid aliasing, the period should be longer than twice the latency difference under test. However, if preexisting knowledge distinguishes which channel has a larger latency, the period only needs to be longer than the latency difference. The period can be further reduced if prior to the measurement the latency difference can be estimated to within one period.

In other fashions, the links and test setup may vary. For instance, the channels with the links can be the different WDM wavelengths on the same fiber. Also, within an optical network, the channels can be logical paths which may traverse multiple O/E/O sites. For another instance, the trigger generation may be removed if the channels are capable of transmit arbitrary patterns without any segmentation, framing, scrambling, or coding, so that pattern streams can be directly shaped into the trigger signals. In Synchronous Optical Network (hereinafter, "SONET") however, a traffic generator must be used for pattern generation, and traffic analyzers must be used for trigger generation. The oscilloscope may be any instrument capable of measuring time delay between the two triggers or between certain features in the two pattern streams.

The aforementioned method is problematic because the test setup is divided between two nodes. Node 1 100 contains the pattern generation test setup and node 2 130 contains the trigger generation setup. Node 1 100 and node 2 130 may be stationed many miles apart, as in a submarine optical system, and if the test is not fully automated there may involve some human coordination between the node 1 100 and node 2 130.

In addition, for bidirectional measurements, both nodes must have pattern generators, trigger generators, and oscilloscope capabilities, doubling the components needed to measure latency.

SUMMARY OF THE INVENTION

The present invention provides a system, apparatus, and method for determining latency differences in channels within a link at a single test site. In particular, the method allows for a single transmitting and receiving site to determine distinct latency differences on both transmitter and receiver-side paths without requiring a terminating node on the other side of the connection. The present invention is based on round trip measurements and switching capability of the receiving node. In other words, a switch is used, in lieu of a terminating node, at the other side of the paths that switches at least one channel's content onto another channel and sends it back for a round trip measurement on various transmitter-and-receiver-side-paths combinations.

In the various embodiments of the present invention, latency differences are measured at a single test site, thus alleviating the possibly needed human coordination at multiple sites that may be thousands of miles apart. In addition, the present invention requires only a single test site node to be equipped with pattern generator, trigger generator, and oscilloscope capabilities, thereby eliminating the need to double the amount of equipment used to determine latency differences.

Other objects and attainments together with a fuller understanding of the invention will become apparent and appreciated by referring to the following description and claims taken in conjunction with the accompanying drawings. For example, the present invention can also be used in a mesh network as long as all switches or receiving nodes are accessible by a transmitting node or test site.

BRIEF DESCRIPTION OF THE DRAWINGS

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

DETAILED DESCRIPTION OF THE PREFERRED EMBODIMENTS

The following description is set forth for purpose of explanation in order to provide an understanding of the invention. However, it is apparent that one skilled in the art will recognize that embodiments of the present invention, some of which are described below, may be incorporated into a number of different computing systems and devices. The embodiments of the present invention may be present in hardware, software or firmware. Structures shown below in the diagram are illustrative of exemplary embodiments of the invention and are meant to avoid obscuring the invention. Furthermore, connections between components within the figures are not intended to be limited to direct connections. Rather, data between these components may be modified, re-formatted or otherwise changed by intermediary components.

Reference in the specification to "one embodiment", "in one embodiment" or "an embodiment" etc. means that a particular feature, structure, characteristic, or function described in connection with the embodiment is included in at least one embodiment of the invention. The appearances of the phrase "in one embodiment" in various places in the specification are not necessarily all referring to the same embodiment.

Various embodiments of the invention may be applied to submarine optical systems, some of which may be used as trans-oceanic optical networks that connect terrestrial systems across a large body of water. One skilled in the art will recognize that the length in which an optical signal travels on these trans-oceanic systems presents diverse engineering issues including latency, dispersion, and skew compensation.

These issues are further complicated as the data rate of a client signal increases and the total number of channels on which a signal is transmitted expands. One skilled in the art will recognize that the following discussion, although described in relation to a trans-oceanic optical system, may be applied to any type of networking system in which skew and latency management are relevant, such as long-haul terrestrial optical systems.

Latency is found in either a computer system or a network; in the latter, latency, a synonym for delay, is an expression of how much time it takes for data to get from one designated point to another.

Figure 1:
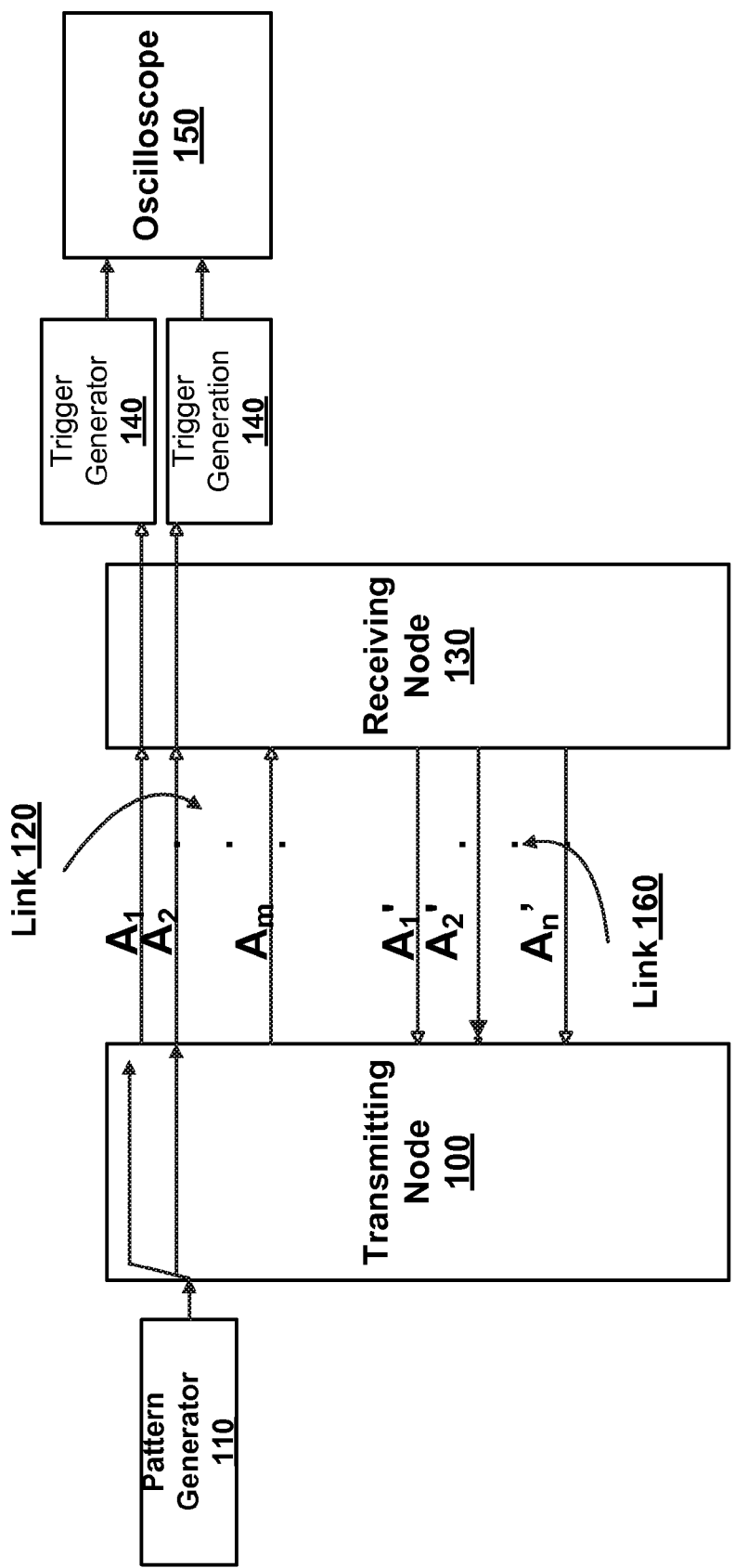
FIG. 1 is an illustration of a general method to measure latency difference in a multi-channel communication link.
Figure 2A:
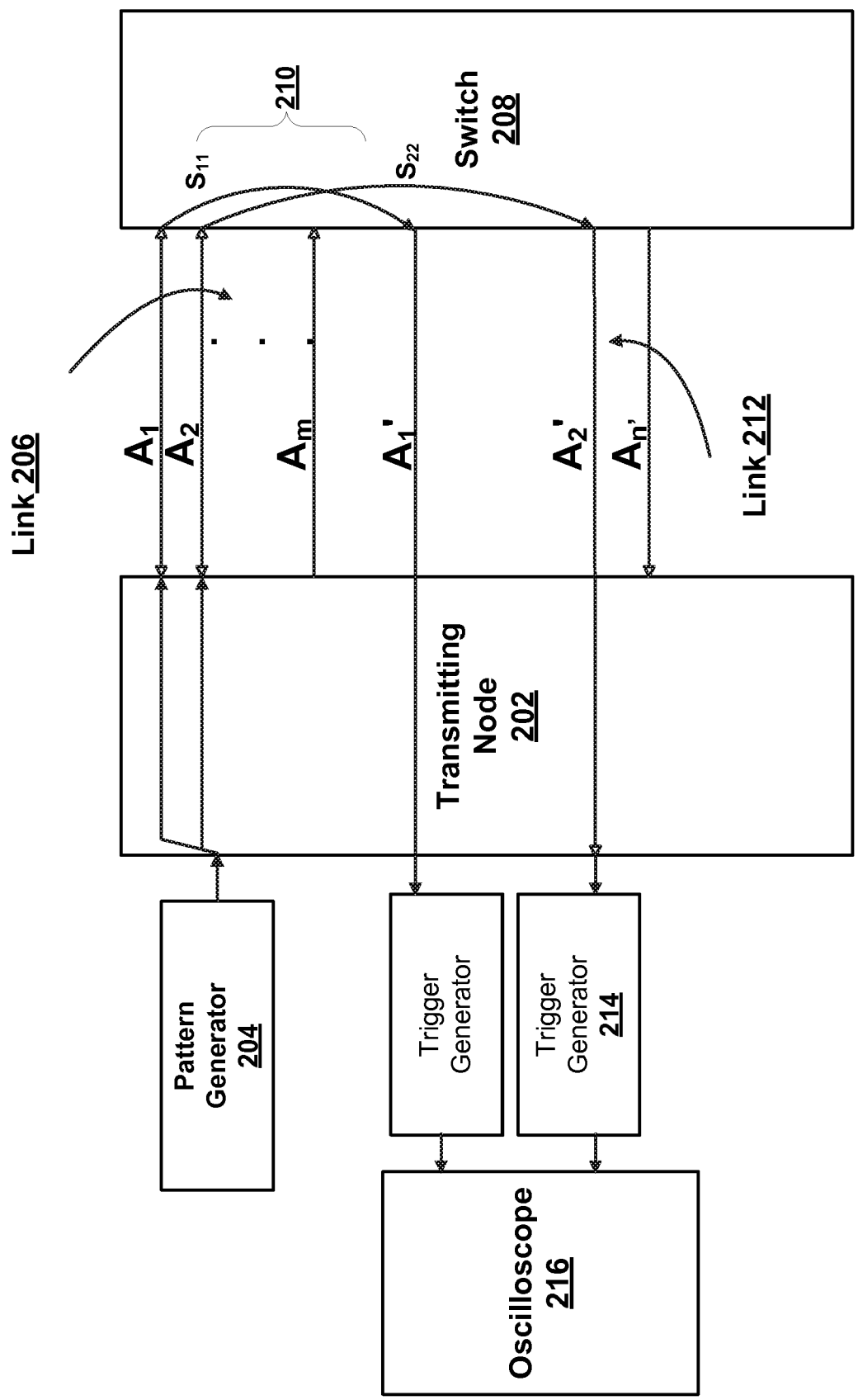
FIG. 2A is an illustration of a single test site configuration to measure latency differences using a "bar" configuration in accordance with various aspects of the present invention.
Figure 2B:
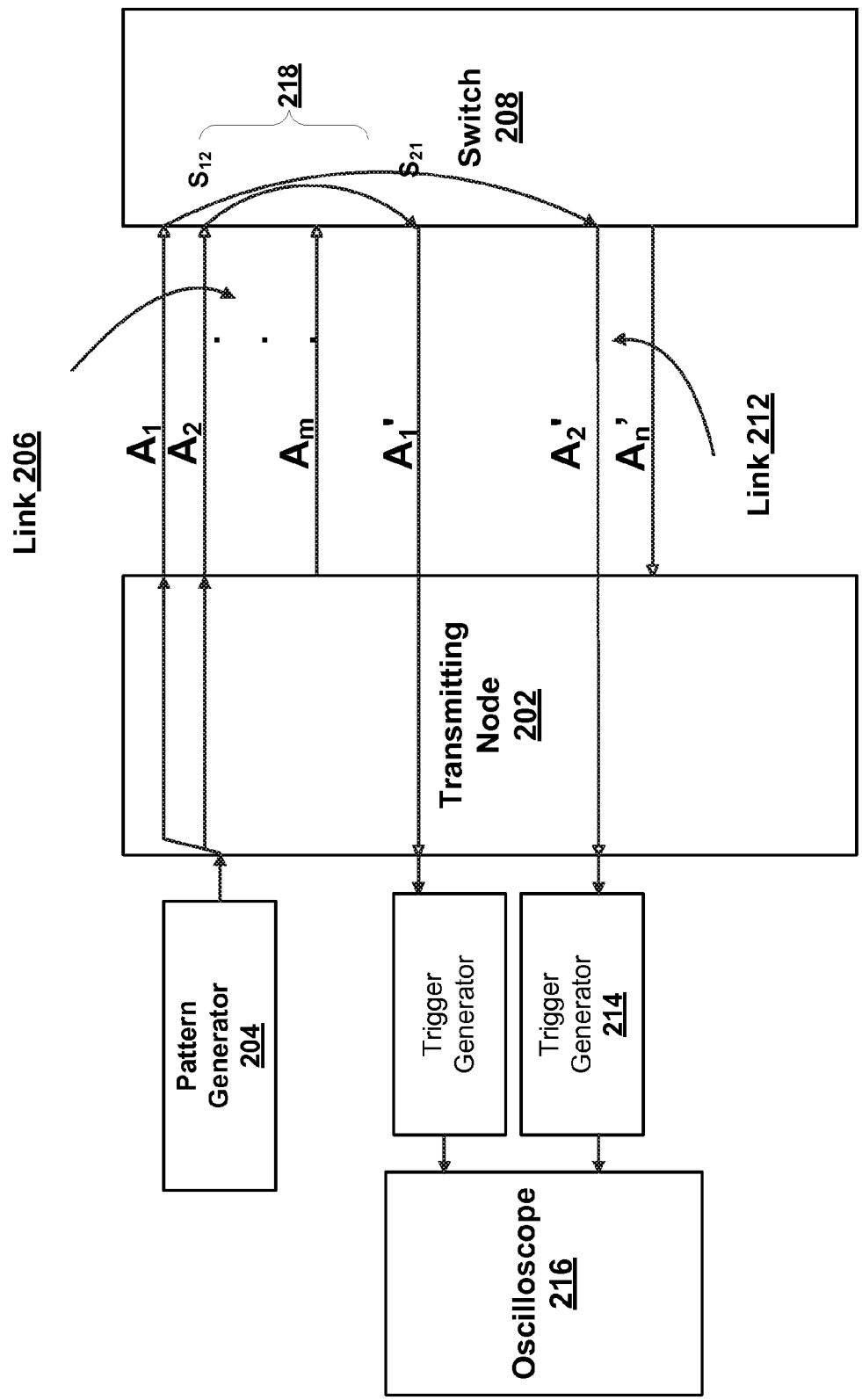
FIG. 2B is an illustration of a single test site configuration to measure latency differences using a "cross" configuration according to various embodiments of the present invention.

FIGS. 2A and 2B illustrates a method for determining latency along both transmitting and receiving links of a network system, such as a submarine optical system, according to various embodiments of the invention. FIG. 2A is an illustration of the "bar" configuration and FIG. 2B is an illustration of the "cross" connection.

In particular, the method allows for a single transmitting and receiving site to determine distinct latencies on both transmitter and receiver-side links without requiring a terminating node on the other side of the connection. In other words, a switch is used, in lieu of such a terminating node, at the other side of the links that switches at least one channel's content onto another channel and sends it back for a round trip measurement on various transmitter-and-receiver-side-paths combinations.

In various embodiments, a pattern generator 204, coupled to a transmitter 202, creates a pattern stream that is split into two copies for transmission across a link 206 of at least two channels $A_1$ and $A_2$. A switch 210, coupled to receive the two pattern streams from the transmitter 202, switches the two pattern streams from a transmitter path link 206 to a receiver path link 212 for a round trip back to the originating transmitter 202. The trigger generation module 214, coupled to the switch 210, receives the receiver side pattern streams based upon a common feature in each copy. An oscilloscope 216, coupled to the trigger generators 214, receives the two pattern streams and the time delay between the two triggers can thus be measured. Assuming the measurement introduced additional latency difference is negligible; this measured time delay is equal to the latency difference between the two round-trip channels.

It is important to note that the number of channels on the transmission link 206 and receiver link 212 do not have to be equal. Furthermore, the channels on the transmission link 206 and receiver link 212 do not have to have the same wavelengths.

In FIGS. 2A and 2B $A_1, A_2, \ldots, A_m$ represent the latencies of the channels traveling from transmitter node 202 to the switch 210, while $A_1', A_2', \ldots, A_n'$ represent the latencies of the channels traveling from the switch 210 to the transmitter node 202. The switching induce latencies $S_{11}$, $S_{12}$, $S_{21}$, $S_{22}$ can either be ignored or be constant among the different path configurations allowing them to be cancelled in the latency difference calculation.

In order to determine the latency difference between $A_1$ and $A_2$ as well as the latency difference between $A_1'$ and $A_2'$, two test pattern transmission steps are performed to determine the round-trip latency differences of the four distinct paths combinations. Each link within the particular network configuration must be traversed and each link must further have at least two channels in order to determine distinct latency differences on both transmitter and receiver-side paths without requiring a terminating node on the other side of the connection.

In particular, in the first test step, a test pattern is sent via channel $A_1$ and returns via $A'_1$; simultaneously, another copy of the same test pattern is sent via channel $A_2$ and returns via $A_2'$. In the second test step, a test pattern is sent via channel $A_1$ and returns via $A_2'$; simultaneously, another copy of the same test pattern is sent via channel $A_2$ and returns via $A_1'$. The two latency differences of the one-way paths may be calculated using the two resulting equations. The distinct channel latency differences may be solved as follows:

In the "bar" configuration, the round-trip latencies are:

$$A_1 + A_1' + S_{11} = B_{11}$$

$$A_2 + A_2' + S_{22} = B_{22}$$

In the "cross" configuration, the round-trip latencies are:

$$A_1 + A_2' + S_{12} = B_{12}$$

$$A_2 + A_1' + S_{21} = B_{21}$$

In the "bar" configuration, the round-trip latency difference can be measured to be:

$$D_1=B_{11}-B_{22}=A_1+A_1'+S_{11}-A_2-A_2'-S_{22}$$

In the "cross" configuration, the round-trip latency difference can be measured to be:

$$D_2=B_{12}-B_{21}=A_1+A_2'+S_{12}-A_2-A_1'-S_{21}$$

Ignoring ($S_{11}$-$S_{22}$) and ($S_{12}$-$S_{21}$), the one-way path latency differences in both directions may be solved according to:

$$A_1-A_2=\tfrac{1}{2}(D_1+D_2)$$

$$A_1'-A_2'=\tfrac{1}{2}(D_1-D_2)$$

Figure 3:
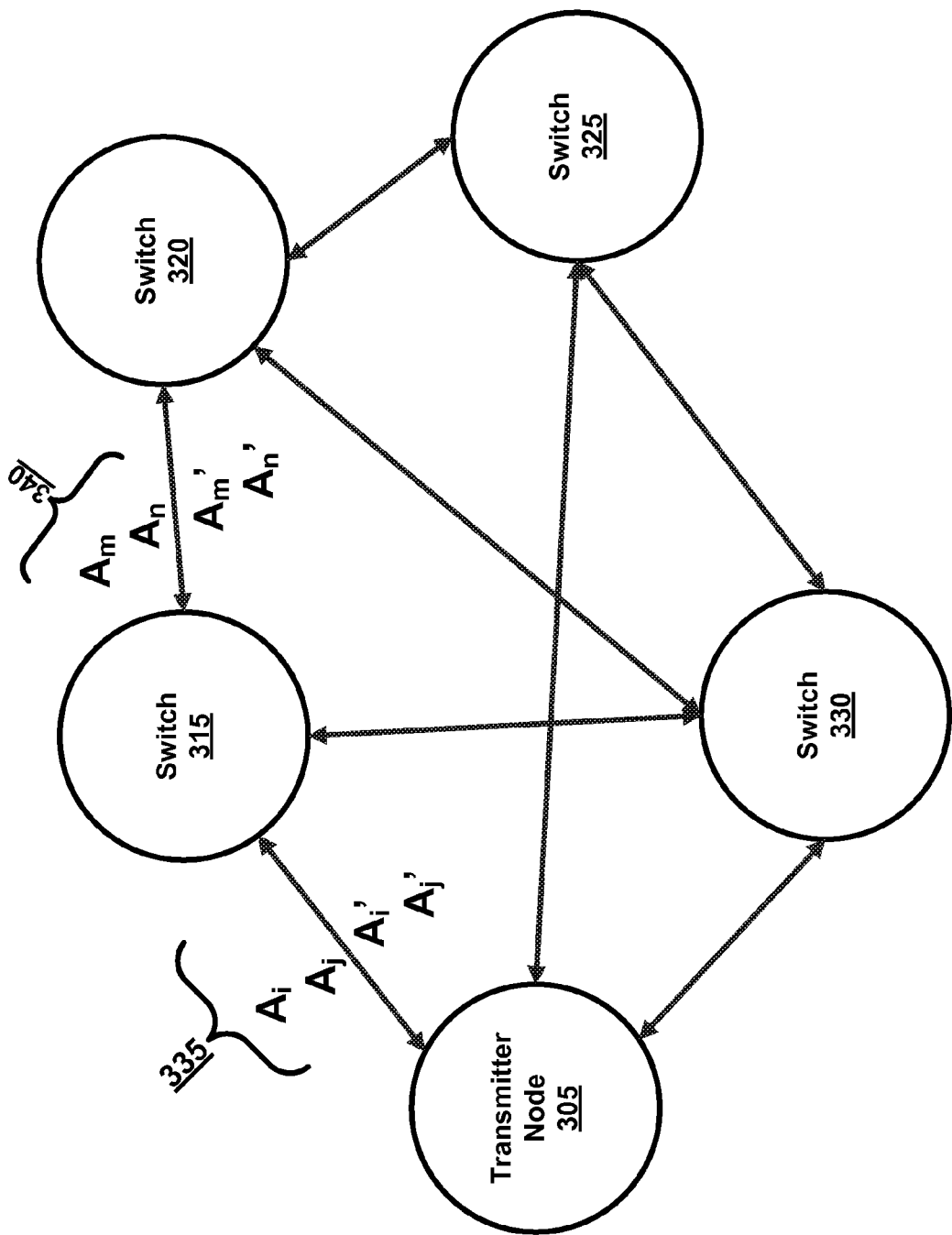
FIG. 3 is a latency testing system in which latency on independent paths in a mesh network is determined according to various embodiments of the present invention.

In another embodiment of the invention, FIG. 3 illustrates a mesh network having at least one test site 305 and a plurality of nodes coupled to the test site via a plurality of links. In principle, the same method as illustrated in FIGS. 2A and 2B may be applied. Assuming the links in the network are bidirectional; each link has at least two channels within the link; and that all of the nodes within the plurality of nodes have the capability to switch any eastbound channel back onto any westbound channel as well as switch any eastbound channel onto any eastbound channel to the next hop.

In FIG. 3, let node 305 be the test site and node 315, node 320, node 325, and node 330 be switches. Using the aforementioned methods in both the "bar" and "cross" configurations, latency differences ($A_i$-$A_j$) and ($A_i'$-$A_j'$) 335 between node 305 and node 315 can be obtained in two measurements. Another latency measurement is performed by switching channel i to m, channel j to n, channel m' to i', and channel n' to j'. Using the same method and ignoring the switching induced delay differences, latency differences are calculated as follows:

In the "bar" configuration:

$$B_{11}=A_i+A_m+A_m'+A_i'$$

$$B_{22}=A_j+A_n+A_n'+A_j'$$

In the "cross" configuration:

$$B_{12}=A_i+A_m+A_n'+A_j'$$

$$B_{21}=A_j+A_n+A_m'+A_i'$$

Using the same technique as discussed in FIGS. 2A and 2B, the following latency differences can be measured:

In the "bar" configuration:

$$D_1=B_{11}-B_{22}=A_i+A_m+A_m'+A_i'-A_j-A_n-A_n'-A_j'$$

In the "cross" configuration:

$$D_2=B_{12}-B_{21}=A_i+A_m+A_n'+A_j'-A_j-A_n-A_m'-A_i'$$

The distinct latencies in the "bar" and "cross" configuration are solved accordingly:

$$\tfrac{1}{2}(D_1-D_2)=A_m'+A_i'-A_n'-A_j'$$

$$\tfrac{1}{2}(D_1+D_2)=A_i+A_m-A_j-A_n$$

therefore ($A_m$-$A_n$) and ($A_m'$-$A_n'$) can be calculated. In four measurements, four one-way latency differences between node 305 and node 315 as well as node 315 and node 320 are obtained from the linear equations. The test can continue to map out the latency differences between any two nodes as long as all the nodes are reachable from node 305. The number of measurements required is equal to the number of latency differences.

In yet another embodiment of the present invention, both the "bar" and "cross" configurations show that if the round-trip latencies $B_{11}$, $B_{12}$, $B_{21}$, and $B_{22}$ can be measured directly rather than only being able to measure the latency differences, and the switching latencies can be ignored or measured separately, the four latencies $A_1$, $A_2$, $A_1'$, and $A_2'$ can be solved from four linear equations. For example, using the same technique as employed in FIG. 3 in a mesh network, $A_i$, $A_j$, $A_i'$, and $A_j'$ can be obtained along with latencies ($A_i$+$A_m$), ($A_j$+$A_n$), ($A_i'$+$A_m'$) and ($A_j'$+$A_n'$), and thus latencies $A_m$, $A_n$, $A_m'$, and $A_n'$ can be calculated. Thus, the latencies of each channel on each link in the mesh network may be obtained and mapped out using a single test site.

Figure 4:
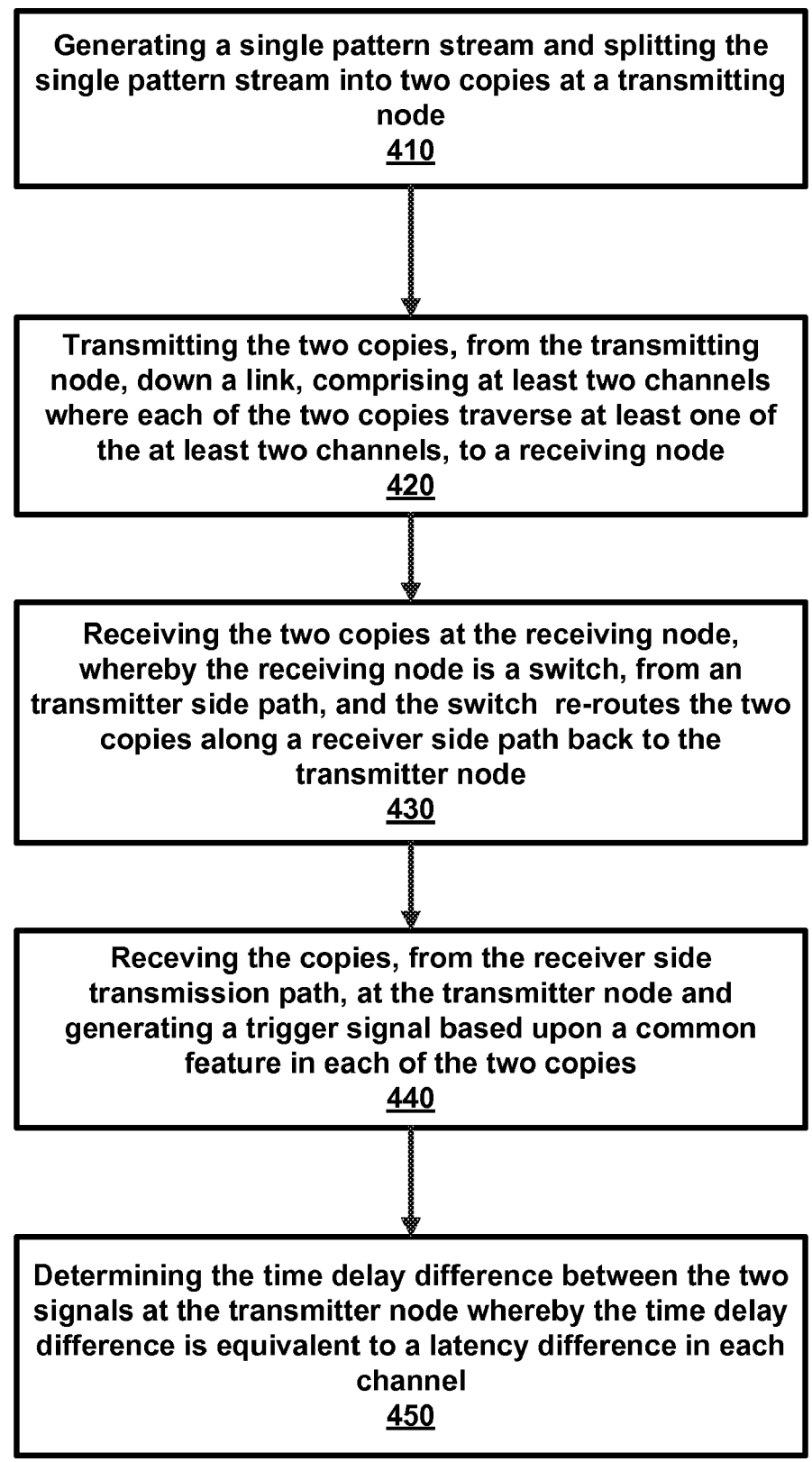
FIG. 4 is a method of determining latency on independent channels according to various embodiments of the present invention.

In another embodiment of the present invention, FIG. 4 illustrates a method, independent of structure, to determine distinct latency differences in a network. According to various embodiments of the invention, the method comprises the steps of generating a pattern stream and splitting the pattern stream into multiple pattern streams 410. Transmitting a first and a second pattern stream in a first and a second transmitter-side channel 420. The first and second pattern streams from the transmitter-side channels are switched onto a first and a second receiver-side channel to complete the round-trip back to the transmitting node 430.

The first and second receiver side pattern streams are received at the original transmitting node whereby trigger signals are generated based upon a common feature in the first and second receiving side pattern streams 440. The time delay difference is determined between the first and second receiver side pattern streams 450. This time delay difference is equivalent to the latency differences within each round-trip path.

It is important to note that the switch may also send the first and second transmitting side pattern streams to any node in the network before the first and second transmitting side pattern streams are sent to the transmitting node for latency analysis. Furthermore, the first and second transmitting side channels do not have to have anything in common with the first and second receiver side channels (e.g., the same wavelength) to calculate latencies across the channels.

One skilled in the art will recognize that the above-described method for calculating latency across diverse paths may be applied to any number of paths greater than two. Additionally, the method may be applied to any type of network including but not limited to both submarine and terrestrial optical systems.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications, combinations, permutations, and variations as may fall within the spirit and scope of the appended claims.

I claim:

1. A method comprising:
generating first and second test patterns, the first test pattern being identical to the second test pattern;
transmitting the first test pattern from a first network node on a first channel to a switch having first and second inputs and first and second outputs, the switch being provided in a second network node, the switch receiving the first test pattern at the first input and outputting the first test pattern at the first output, such that the first test pattern is transmitted back to the first network node on a second channel, the first and second channels constituting portions of a first round trip path;
transmitting the second test pattern from the first network node on a third channel to the switch in the second node, the switch receiving the second test pattern at the second input and outputting the second test pattern at the second output, such that second test pattern is transmitted back to the first network node on a fourth channel, the third and fourth channels constituting portions of a second round trip path;

obtaining latency measurements associated with the first and second round-trip paths;

determining a latency value associated with each of the first, second, third, and fourth channels based on the latency measurements.

2. The method of claim 1 wherein the latency value includes a differential latency value across the first and second round-trip paths.

3. The method of claim 1 further including routing the first test pattern over a bar connection in the switch.

4. The method of claim 1 further including routing the first test pattern over a cross-connection in the switch.

5. The method of claim 1 wherein generating the first and second test patterns is performed external to the first network node.

6. The method of claim 1 wherein said obtaining the latency measurements is performed with an oscilloscope.

7. An apparatus comprising:
a test pattern generator that generates a plurality of identical test patterns, the test pattern generator being configured to supply the plurality of identical test patterns to a first network node;
a transmission interface, coupled within the first network node and configured to transmit each of the plurality of identical test patterns to a second network node on a corresponding one of a first plurality of channels;
a receiver interface, coupled within the first network node and configured to receive each of the plurality of identical test patterns from the second network node on a corresponding one of a second plurality of channels;
a switch, coupled within the second network node, the switch having a plurality of inputs and a plurality of outputs and being coupled to the first and second pluralities of channels, such that the switch receives each of the plurality of identical test patterns at a corresponding one of the plurality of inputs from the first node and each of the plurality of identical test patterns are transmitted back to the first node from a corresponding one of the plurality of outputs;
a trigger generator, coupled to communicate with the first network node, the trigger generator configured to align the plurality of identical test patterns from the plurality of second channels; and
a latency measurement circuit, coupled to the trigger generator, the latency measurement circuit configured to identify a latency value associated with at least one of the first plurality of channels or at least one of the second plurality of channels.

8. The apparatus of claim 7 wherein the latency value is a differential latency value between a first of the first plurality of channels and a first of the second plurality of channels and a second of the first plurality of channels and a second of the second plurality of channels.

9. The apparatus of claim 7 wherein the trigger generator aligns the plurality of identical test patterns from each of the plurality of second channels relative to a frame alignment sequence.

10. The apparatus of claim 7 wherein the latency measurement device is an oscilloscope coupled to the first network node.

11. The apparatus of claim 1 wherein the latency value is not based on a delay across the switch.

12. The apparatus of claim 7 wherein the first network node is coupled within a mesh network.

13. A system comprising:
a first network node that transmits each of a plurality of identical test patterns on a corresponding one of a first plurality of channels, the first network node being coupled to a second plurality of channels;
a second node including a switch, the switch having a plurality of inputs and a plurality of outputs and being configured to switch each of the plurality of test patterns from the first plurality of channels to a corresponding one of the second plurality of channels via a respective one of the plurality of inputs and a respective one of the plurality of outputs, such that the plurality of test patterns are directed back to the first network node; and
a latency measurement circuit, coupled to communicate with the first network node, the latency measurement circuit configured to identify a latency value associated with at least one of the first plurality of channels or at least one of the second plurality of channels.

14. The system of claim 13 wherein the plurality of identical test patterns is generated external to the first network node and provided to the first network node on an interface.

15. The system of claim 13 further comprising a trigger generator, the trigger generator being configured to align selected ones of the plurality of test patterns received from at least two of the plurality of second channels.

16. The system of claim 15 wherein the latency measurement circuit is an oscilloscope.

17. The system of claim 15 wherein the latency value is a differential latency value associated with the selected ones of the plurality of test patterns.

18. The system of claim 13 wherein the latency value is a round-trip latency measurement for each of the first plurality of channels and each of the second plurality of channels.

19. The system of claim 13 wherein the switch is a reconfigurable optical add-drop multiplexer.

* * * * *